J. M. WALTERS.
Wagon Spindle.

No. 113,710.

Patented April 11, 1871.

Witnesses
John A. Gordon
A. L. Taggart

Inventor:
James Monroe Walters

United States Patent Office.

JAMES MONROE WALTERS, OF SCHWENKSVILLE, PENNSYLVANIA.

Letters Patent No. 113,710, dated April 11, 1871.

IMPROVEMENT IN WAGON-SPINDLES.

The Schedule referred to in these Letters Patent and making part of the same.

*To all whom it may concern:*

Be it known that I, JAMES MONROE WALTERS, of Schwenksville, in the county of Montgomery and State of Pennsylvania, have invented a new and valuable Improvement in Axle-Spindles; and I do hereby declare that the following is a full, clear, and exact description of the construction and operation of the same, reference being had to the annexed drawing making a part of this specification and to the letters and figures of reference marked thereon.

Figure 1:
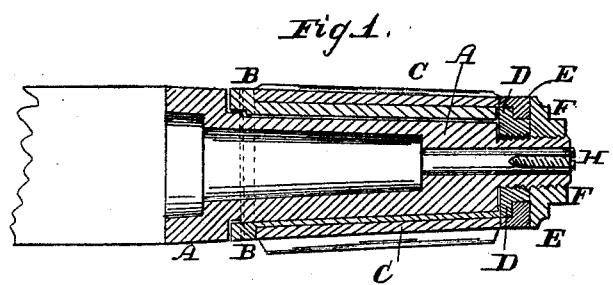

Figure 1 of the drawing represents a vertical central longitudinal section of my invention.

Figure 2:
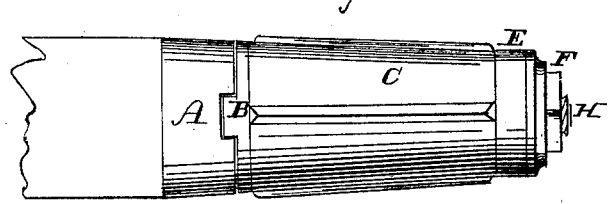

Figure 2 represents a side view of the same.

My invention has relation to an improvement in the means of attaching a wheel of a wagon to its axle; and It consists in the construction and novel arrangement of devices designed to prevent undue wear of the parts which move upon each other.

The letter A of the drawing designates the axle-skein, made of soft cast-iron, to enable a screw-thread to be turned on its end in the usual manner. This skein is slipped on the tapering end of the wooden axle-tree and securely fastened.

B represents a cast-iron sleeve, the metal of which is designed to be hardened or indurated by chilling or otherwise.

C represents the box of the hub, also made of hard metal. The inner end of this box moves on the outer face of the flanch of the sleeve B. The outer end of the box is in contact with a hard-metal washer, hereinafter described.

D represents a nut of soft metal, the diameter of which is equal to the diameter of the end of the skein B and serves to keep this skein in position.

E represents a hard-metal washer, which has a square opening through its center and is placed on the square end of the nut D.

The nut D and washer E are made in separate parts, in order that the box may be readily removed from the skein without danger of the latter becoming loose. The nut D is made of soft metal, because a female screw-thread has to be turned within it. The washer E is of hard metal, to sustain the wear of the end of the box C.

Over the washer and nut D is screwed the nut F, and the screw H is inserted into the end of the wooden spindle.

It is apparent that the box C of hard metal moves entirely against hard-metal surfaces, and yet those parts which are necessarily operated upon after the casting, in order to cut the screw-threads, may be made of soft iron, thus facilitating the manufacture and cheapening the cost thereof.

What I claim as my invention, and desire to secure by Letters Patent, is—

The combination of the axle-skein A and nuts D and F, all of soft metal, with the sleeve B and washer E, both of chilled cast-iron or hardened metal, substantially as specified.

JAMES MONROE WALTERS.

Witnesses:
J. WRIGHT APPLE,
PHILIP QUILLMARX.